GAS DISPENSER ASSEMBLY

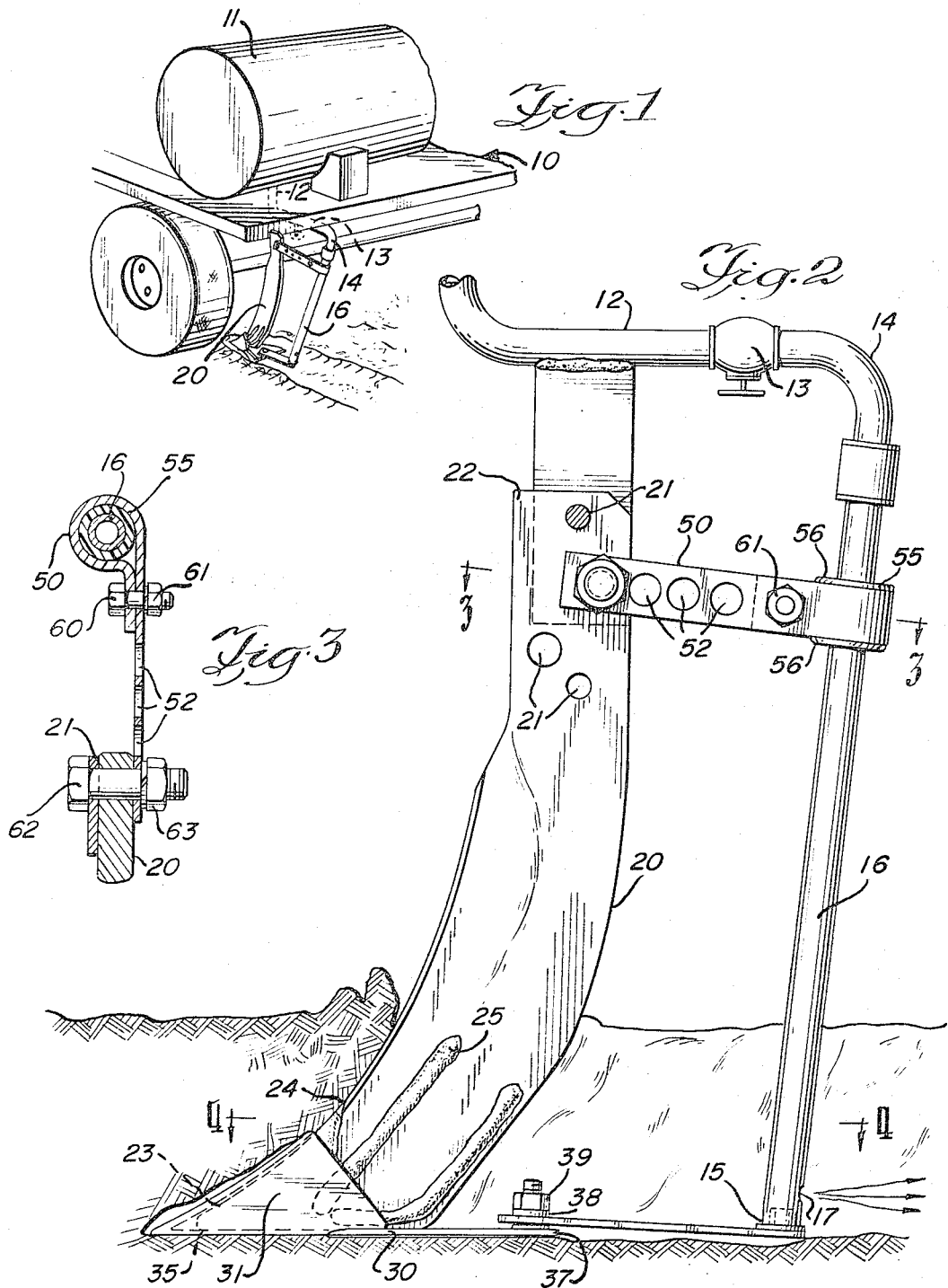

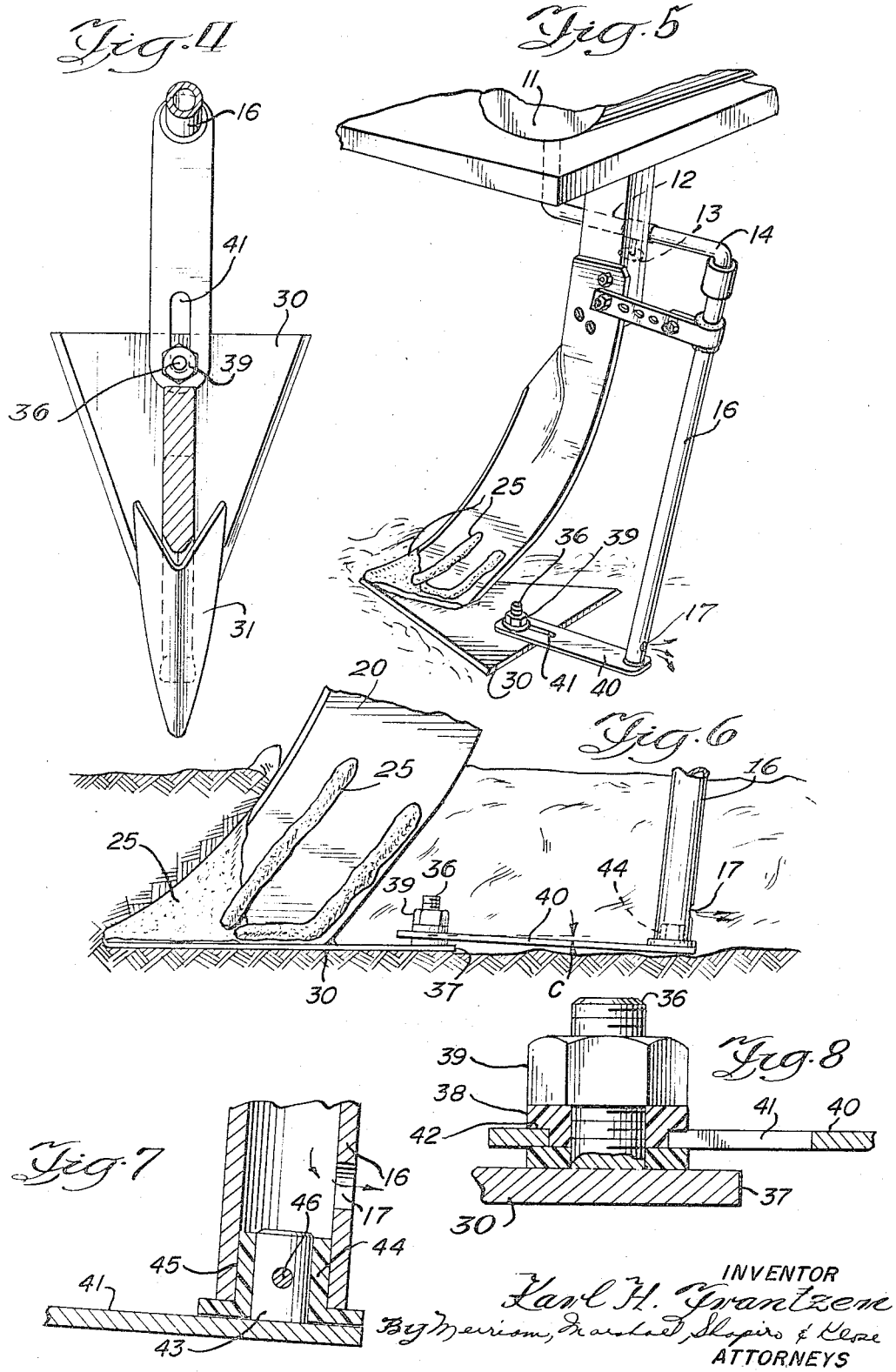

Karl H. Frantzen, Omaha, Nebr., assignor to Northern Gas Products Company, Omaha, Nebr., a corporation of Delaware
Filed July 30, 1965, Ser. No. 476,098
3 Claims. (Cl. 111—7)

This invention relates to a novel means for injecting liquid propane or the like into furrows and more particularly relates to an adapter means whereby a propane dispenser assembly can be adapted to a conventional tine.

It is known that soil which is permeated with an alkane gas is extremely beneficial for providing better growth of cultural or cultivated plants propagated in soils. The use of propane and other butane gases for soil permeation is disclosed in my Patent No. 3,184,891 issued May 25, 1965.

It has been found in the course of injecting an alkane gas, such as propane, into the soil that the location of the injection nozzle immediately behind or adjacent the tine cutting edge was unsatisfactory because, upon gas discharge during an injection operation, there was a tendency to freeze the recently tilled soil to the cutting edge of a tine. The minimization of this and other undesirable features, which occurred when the injection nozzle was located directly behind the cutting edge, was the basis of the disclosure in my Patent 3,185,117 issued May 25, 1965.

Unfortunately, tines presently available on the market do not have injection nozzle means attached thereto so that it is necessary to adapt the tine with an injection nozzle in an efficient, expedient and economical manner.

According to the present invention, an adapter has been made for attaching a nozzle injection means to a conventional tine whereby a farmer can readily adapt the tines he presently has with a nozzle injection means of the present invention. The nozzle means is located behind the cutting edge of the tine approximately 6 to 8 inches and is positioned to ride in the hollow of the valley made by the cutting implement. The discharge hole in the nozzle means is positioned so that propane or other gas will be injected in the soil in a direction away from the cutting edge of a tine, thereby obviating soil freeze-up around a tine. The soil is easily innoculated with the necessary amount of propane or other alkane gas, after which the soil falls back into the hollow by gravity or by a leveling means located behind the gas discharge means.

Other features and advantages are inherent in the structure claimed and disclosed, as will be apparent to those skilled in the art from the following detailed description in conjunction with the accompanying drawings wherein:

FIGURE 1 shows a fragmentary view of a gang subsoil plow or tine having a propane dispenser and dispensing nozzle attached thereto;

FIGURE 2 shows a side view illustrating a tine having a gas dispenser assembly adapted thereto;

FIGURE 3 shows a sectional view taken along line 3—3 on FIGURE 2;

FIGURE 4 shows a sectional view taken along line 4—4 in FIGURE 2;

FIGURE 5 shows a perspective view of another embodiment of the propane dispenser assembly of the present invention adapted to a conventional soil cutting tool;

FIGURE 6 shows a side view of the dispensing nozzle assembly of FIGURE 5;

FIGURE 7 shows an arrangement for fastening the lower end of the gas discharge nozzles of FIGURES 2 and 6 to the rest of the dispenser adapter; and, FIGURE 8 shows an enlarged view of the adjustable fastening means located at the end of the delta-shaped plate shown in FIGURES 2 and 6.

According to the present invention, a spring tooth harrow having a gang of tines is generally designated 10. A tank 11 containing propane or other suitable alkane gas is attached to the spring harrow in any suitable manner. The lower portion of the tank has a series of discharge outlets 12 with control valves 13 being connected to discharge outlet 12. A resilient connecting member 14 is attached to valve 13.

Tine 20 has a plurality of apertures 21 located near one end 22, whereas the remaining end 23 is curved and shaped to form a soil cutting edge 24. Soil cutting end 23 of tine 20 generally has beads of welded metal 25 deposited thereon for the purpose of increasing the wear life of tine 20.

Tubular member 16, made of stiff polyethylene or other suitable material which minimizes heat exchange between member 16 and tine 20, is connected to member 14. End 15 of member 16, deposed close to the hollow in the valley formed by the tilled soil, is closed and an orifice 17 is located near this end.

Delta-shaped plate 30 is attached to the soil cutting end 24 of tine 20 either by means of sheath member 31 (FIGURE 2), which slips over end 24 of tine 20, or by means of welding plate 30 to the bottom edge of tine 20, FIGURE 6. Plate 30 is substantially perpendicular to tine 20 and extends angularly outward as it proceeds back away from cutting tip 35 of tine 20. The delta like configuration of plate 30 serves to spread the soil and enlarge the size of the furrow made in the soil by a tine and delta-shaped plate 30.

Bolt 36 integral with plate 30 is positioned adjacent edge 37 of plate 30. Grooved insulating bushing 38 made of any suitable heat insulating material is placed over bolt 36 and bushing 38 is maintained in position by nut 39. Metal strip 40 having slot 41 at one end thereof is adjustably positioned within groove 42 of bushing 38.

Near the remaining end of strip 40 a stud 43, integral with strip 40, projects upward. Positioned over stud 43 is flanged insulation bushing 44 and pressed over the outer wall 45 of bushing 44 is tubular member 16. Bushing 34 can be glued to stud 43 by a suitable adhesive or fastened thereto by means of a rivet 46, FIGURE 7, or the like. Also, if desired, strip 40 could be made of the same material as member 16 whereby the tubular member and strip 40 would be made as a unitary member.

Clamp assembly 50 is employed close to the top of tine 20 for clamping the propane dispensing nozzle to the tine. Assembly 50 comprises bracket member 51 having apertures 52 with one end of bracket member 51 being turned back upon itself to form the circular contour of sleeve 55. Bracket 50 is adapted to fit around sleeve 55 and is held relative to sleeve 55 by means of flanges 56 which are located at each end of the sleeve. When sleeve 55 is inserted within bracket 50, a fastener means made up of bolt 60 and nut 61 is employed to hold the bracket in position relative to sleeve 55. In a similar manner, bolt 62 is inserted through an aperture 21 in tine 20 and an aperture 51 in bracket 50 after which nut 63 is drawn up to maintain bracket 50 relative to tine 20.

As viewed particularly in FIGURE 2, tubular member 16 is offset from the vertical so that orifice 17 projects downwardly into the valley of the tilled soil. Gas ejected from nozzle 17 is thereby assured of being sprayed directly onto the tilled soil. It has been found that if strip 40 is displaced from the horizontal at an angle C of about 2° to 10°, and preferably about 3°, orifice 17 is properly oriented relative to the soil to be sprayed.

Although insulating sleeve 55 and bushings 38 and 44 have been illustrated in the embodiments shown in the drawings, it may be that in some instances where a suitable heat insulating material is utilized for tubular member 16, these insulating members will not be necessary.

The foregoing detailed description has been given for clearness of understanding only, and no unnecessary limitations should be understood therefrom, as modifications will be obvious to those skilled in the art.

What is claimed is:

1. In a soil furrowing apparatus having a tine, said tine having a cutting edge and a gas dispenser attached thereto, a gas discharge assembly for dispensing gas into the soil following a furrowing operation, said assembly comprising:

a tubular discharge member adapted for extending into the valley formed during a furrowing operation, said member having an opening therein which is normally positioned near the hollow of said valley during a furrowing operation, said member spaced from the tine along the entire length of the member to minimize heat transfer from the tine to said member and said member having a top end and an open bottom end;

an adjustable, connecting means contiguous to the top end of said tubular member for connecting said member to the top of said tine;

a triangular-shaped plate joined to said tine to form a substantially pointed end, two of the three edges of said plate diverging outwardly away from said tine and said plate being substantially perpendicular to said tine;

an insulated stud member integral with said plate and positioned adjacent the third edge of said plate;

a strip having two ends, said strip slotted at one end and adjustably fastened to said stud member;

a second stud member integral with said strip and located adjacent said remaining end of said strip; and said second stud member being inserted within said open bottom end of said tubular member.

2. An assembly in accordance with claim 1 wherein said plate has a sheath member integral with said plate adapted for receiving said tine.

3. A gas discharge assembly in accordance with claim 1 wherein said strip is pitched downward from the horizontal in a direction away from said tine at an angle of about 2°–10°.

References Cited
UNITED STATES PATENTS

| | | | |
|---|---|---|---|
| 565,352 | 8/1896 | Hickman | 172—699 |
| 2,558,154 | 6/1951 | Porter | 172—195 |
| 2,988,026 | 6/1961 | Heckathorn | 111—7 |
| 3,038,424 | 6/1962 | Johnson | 111—7 |
| 3,185,117 | 5/1965 | Frantzen | 111—7 |

ABRAHAM G. STONE, *Primary Examiner.*

ROBERT E. BAGWILL, *Examiner.*